United States Patent
Cronin et al.

(10) Patent No.: US 9,886,172 B1
(45) Date of Patent: Feb. 6, 2018

(54) SOCIAL MEDIA-BASED PUBLISHING AND FEEDBACK

(71) Applicant: Rich Media Ventures, LLC, Miami, FL (US)

(72) Inventors: John Cronin, Bonita Springs, FL (US); Neil Balthaser, Montreal (CA)

(73) Assignee: Rich Media Ventures, LLC, Miami, FL (US)

( * ) Notice: Subject to any disclaimer, the term of this patent is extended or adjusted under 35 U.S.C. 154(b) by 0 days.

(21) Appl. No.: 15/142,095

(22) Filed: Apr. 29, 2016

(51) Int. Cl.
| G06F 17/22 | (2006.01) |
| G06F 3/0483 | (2013.01) |
| G06F 3/01 | (2006.01) |
| H04W 4/02 | (2009.01) |

(52) U.S. Cl.
CPC ............ G06F 3/0483 (2013.01); G06F 3/013 (2013.01); H04W 4/02 (2013.01)

(58) Field of Classification Search
CPC .. G06F 3/0483; G06F 17/212; G06F 17/2288; G06F 17/30011; G06F 17/2725; G06F 3/013; H04W 4/02
See application file for complete search history.

(56) References Cited

U.S. PATENT DOCUMENTS

| 6,011,537 | A | 1/2000 | Slotznick |
| 6,189,097 | B1 | 2/2001 | Tycksen et al. |
| 6,341,174 | B1 | 1/2002 | Callahan et al. |
| 6,480,861 | B1 | 11/2002 | Kanevsky et al. |
| 6,611,358 | B1 | 8/2003 | Narayanaswamy |
| 6,704,024 | B2 | 3/2004 | Robotham et al. |
| 7,213,062 | B1 | 5/2007 | Raciborski et al. |
| 7,263,685 | B2 | 8/2007 | Eldar |
| 7,298,851 | B1 * | 11/2007 | Hendricks ............... G06F 21/10 380/277 |
| 7,552,068 | B1 | 6/2009 | Brinkerhoff |
| 7,620,555 | B1 | 11/2009 | Plotkin |
| 7,711,513 | B2 | 5/2010 | Sotirou |
| 7,941,399 | B2 | 5/2011 | Bailor et al. |
| 8,005,825 | B1 | 8/2011 | Ghosh |
| 8,312,079 | B2 | 11/2012 | Newsome et al. |
| 8,346,585 | B1 | 1/2013 | Griffith et al. |
| 8,392,538 | B1 | 3/2013 | Lee |
| 8,423,889 | B1 | 4/2013 | Zagorie et al. |
| 8,487,775 | B2 * | 7/2013 | Victor .................... A61B 3/113 180/272 |
| 8,666,961 | B1 | 3/2014 | Qureshi et al. |

(Continued)

OTHER PUBLICATIONS

White, Ron; "How Computers Work", 2003 7th Edition, p. 4.

(Continued)

*Primary Examiner* — Maikhanh Nguyen
(74) *Attorney, Agent, or Firm* — Polsinelli LLP

(57) ABSTRACT

Systems, methods, and non-transitory computer readable storage mediums consistent with the present disclosure may include receiving feedback settings set by an author. The feedback settings may be entered by the author over a user interface at a computer. After the feedback settings are set the author may upload an e-book by transmitting the e-book over a computer network for storage. After the e-book has been uploaded, the e-book may be reviewed by one or more readers that may provide feedback to the author based on the feedback settings set by the author.

20 Claims, 13 Drawing Sheets

(56) References Cited

U.S. PATENT DOCUMENTS

| | | | |
|---|---|---|---|
| 8,700,699 | B2 | 4/2014 | Shen et al. |
| 8,725,565 | B1* | 5/2014 | Ryan .................. G06Q 30/0269 |
| | | | 705/14.4 |
| 8,755,058 | B1* | 6/2014 | Jackson .................... G06F 3/14 |
| | | | 358/1.1 |
| 8,826,036 | B1* | 9/2014 | Snodgrass ............... G06F 21/10 |
| | | | 370/235 |
| 8,885,882 | B1* | 11/2014 | Yin .......................... G06F 3/00 |
| | | | 382/103 |
| 8,922,569 | B1 | 12/2014 | Tidd |
| 9,087,056 | B2* | 7/2015 | Cohen ................... G06T 19/006 |
| 9,116,991 | B2* | 8/2015 | Vemula ............. G06F 17/30864 |
| 9,317,186 | B2 | 4/2016 | MacLean et al. |
| 9,331,856 | B1 | 5/2016 | Song |
| 9,348,935 | B2 | 5/2016 | Doig et al. |
| 9,378,299 | B1 | 6/2016 | Rashidi |
| 9,575,615 | B1 | 2/2017 | Nicholls et al. |
| 2002/0006788 | A1 | 1/2002 | Knutsson et al. |
| 2003/0172052 | A1* | 9/2003 | Crandell .................. G09B 5/00 |
| 2003/0177200 | A1 | 9/2003 | Laughlin et al. |
| 2004/0107348 | A1 | 6/2004 | Iwamura |
| 2005/0039034 | A1* | 2/2005 | Doyle .................. H04L 9/0825 |
| | | | 713/193 |
| 2005/0071758 | A1 | 3/2005 | Ehrich et al. |
| 2005/0081041 | A1* | 4/2005 | Hwang .................. H04L 9/088 |
| | | | 713/176 |
| 2005/0177805 | A1 | 8/2005 | Lynch et al. |
| 2005/0193335 | A1 | 9/2005 | Dorai et al. |
| 2006/0218476 | A1 | 9/2006 | Gombert |
| 2007/0168237 | A1 | 7/2007 | Campbell |
| 2007/0239704 | A1 | 10/2007 | Burns et al. |
| 2008/0013915 | A1 | 1/2008 | Gill et al. |
| 2008/0139191 | A1 | 6/2008 | Meinyk et al. |
| 2008/0232598 | A1* | 9/2008 | Vennelakanti .......... G06F 21/62 |
| | | | 380/279 |
| 2008/0243662 | A1 | 10/2008 | Subramaniam |
| 2009/0019356 | A1 | 1/2009 | Deyab et al. |
| 2009/0254802 | A1 | 10/2009 | Campagna et al. |
| 2010/0033333 | A1* | 2/2010 | Victor .................... A61B 3/113 |
| | | | 340/576 |
| 2010/0086278 | A1* | 4/2010 | Stankiewicz ........ G06K 9/4671 |
| | | | 386/278 |
| 2010/0205029 | A1 | 8/2010 | Asherman et al. |
| 2010/0295774 | A1* | 11/2010 | Hennessey .............. G06F 3/013 |
| | | | 345/156 |
| 2011/0289108 | A1 | 11/2011 | Bhandari et al. |
| 2012/0047455 | A1* | 2/2012 | Yuan .................. G06F 15/0291 |
| | | | 715/781 |
| 2012/0105486 | A1* | 5/2012 | Lankford ................ G06F 3/013 |
| | | | 345/661 |
| 2012/0150680 | A1 | 6/2012 | Golus et al. |
| 2012/0150993 | A1 | 6/2012 | Flack et al. |
| 2012/0192254 | A1 | 7/2012 | Garcia Perez et al. |
| 2012/0200573 | A1* | 8/2012 | Stoner ..................... G09B 5/02 |
| | | | 345/472 |
| 2012/0240039 | A1 | 9/2012 | Walker et al. |
| 2012/0246557 | A1 | 9/2012 | Venugopal et al. |
| 2012/0323842 | A1 | 12/2012 | Izhikevich et al. |
| 2012/0325901 | A1 | 12/2012 | Ross |
| 2013/0007036 | A1 | 1/2013 | Childs et al. |
| 2013/0054622 | A1* | 2/2013 | Karmarkar ........ G06F 17/30032 |
| | | | 707/749 |
| 2013/0066746 | A1 | 3/2013 | O'Hara et al. |
| 2013/0073998 | A1* | 3/2013 | Migos ..................... G06F 17/24 |
| | | | 715/776 |
| 2013/0132230 | A1 | 5/2013 | Gibson et al. |
| 2013/0166340 | A1 | 6/2013 | Salame |
| 2013/0191708 | A1* | 7/2013 | Song ........................ G06Q 30/06 |
| | | | 715/202 |
| 2013/0205232 | A1 | 8/2013 | Vandermolen et al. |
| 2013/0283147 | A1 | 10/2013 | Wong et al. |
| 2014/0006308 | A1* | 1/2014 | Baggott ............. G06Q 30/0201 |
| | | | 705/347 |
| 2014/0019562 | A1 | 1/2014 | Le Chevalier et al. |
| 2014/0019766 | A1 | 1/2014 | Takahashi et al. |
| 2014/0074648 | A1* | 3/2014 | Morton ............... G06Q 30/0631 |
| | | | 705/26.7 |
| 2014/0115449 | A1 | 4/2014 | Migos et al. |
| 2014/0115508 | A1 | 4/2014 | MacLean et al. |
| 2014/0172505 | A1 | 6/2014 | Dekhtyaruk |
| 2014/0201180 | A1 | 7/2014 | Fatourechi et al. |
| 2014/0210855 | A1* | 7/2014 | Cohen .................. G06T 19/006 |
| | | | 345/633 |
| 2014/0253694 | A1* | 9/2014 | Zustak ............... H04N 13/0018 |
| | | | 348/51 |
| 2015/0019874 | A1* | 1/2015 | Kim ........................ G06F 21/10 |
| | | | 713/189 |
| 2015/0046827 | A1 | 2/2015 | Akselrod et al. |
| 2015/0082156 | A1 | 3/2015 | Rollins et al. |
| 2015/0154660 | A1 | 6/2015 | Weald et al. |
| 2015/0286489 | A1 | 10/2015 | Brown, Jr. et al. |
| 2015/0356060 | A1 | 12/2015 | Peden |
| 2015/0370331 | A1 | 12/2015 | Gonzales |
| 2016/0110789 | A1 | 4/2016 | Gilb |
| 2017/0243277 | A1 | 8/2017 | You et al. |

OTHER PUBLICATIONS

U.S. Appl. No. 15/142,831 Office Action dated Sep. 22, 2016.
U.S. Appl. No. 15/142,410 Office Action dated Sep. 8, 2016.
U.S. Appl. No. 15/142,419 Office Action dated Aug. 25, 2016.
U.S. Appl. No. 15/142,401 Office Action dated May 8, 2017.
U.S. Appl. No. 15/142,831 Final Office Action dated Apr. 7, 2017.
U.S. Appl. No. 15/142,410 Final Office Action dated Jan. 27, 2017.
U.S. Appl. No. 15/142,419 Final Office Action dated Feb. 10, 2017.
U.S. Appl. No. 15/142,819 Office Action dated Dec. 1, 2016.
U.S. Appl. No. 15/142,401 Office Action dated Nov. 4, 2016.
U.S. Appl. No. 15/143,192 Office Action dated Nov. 21, 2016.
U.S. Appl. No. 15/142,819 Final Office Action dated Jun. 2, 2017.
U.S. Appl. No. 15/142,410 Office Action dated May 18, 2017.
U.S. Appl. No. 15/142,419 Office Action dated Jun. 5, 2017.
U.S. Appl. No. 15/143,192 Final Office Action dated May 30, 2017.
U.S. Appl. No. 15/142,819 Office Action dated Sep. 20, 2017.
U.S. Appl. No. 15/142,401 Final Office Action dated Nov. 11, 2017.
U.S. Appl. No. 15/142,419 Office Action dated Nov. 15, 2017.

* cited by examiner

Conceptual Diagram of Author/Reader Data Flow 100

Overall Self-Publishing Test Market System 150

Author Structured Feedback GUI 200

FIG. 3  Reader Structured Feedback GUI 300

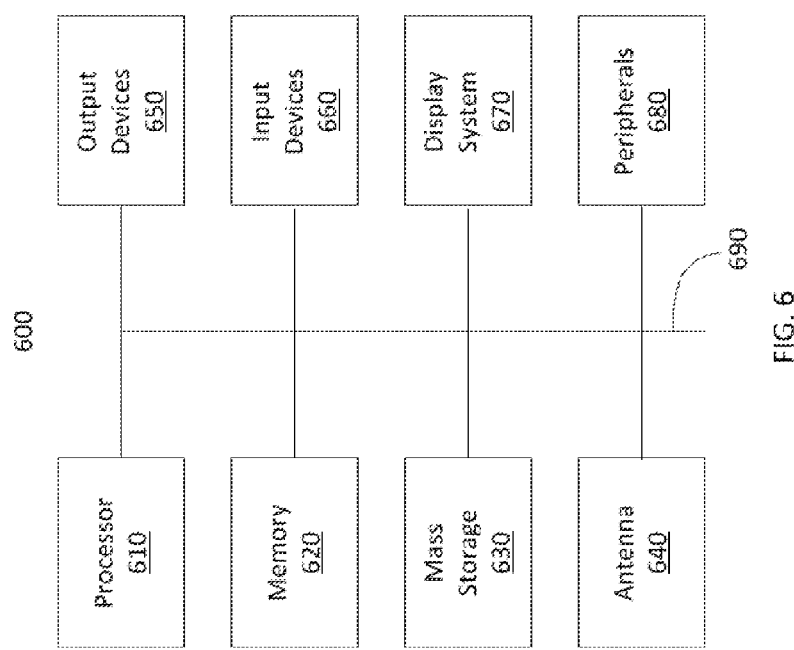

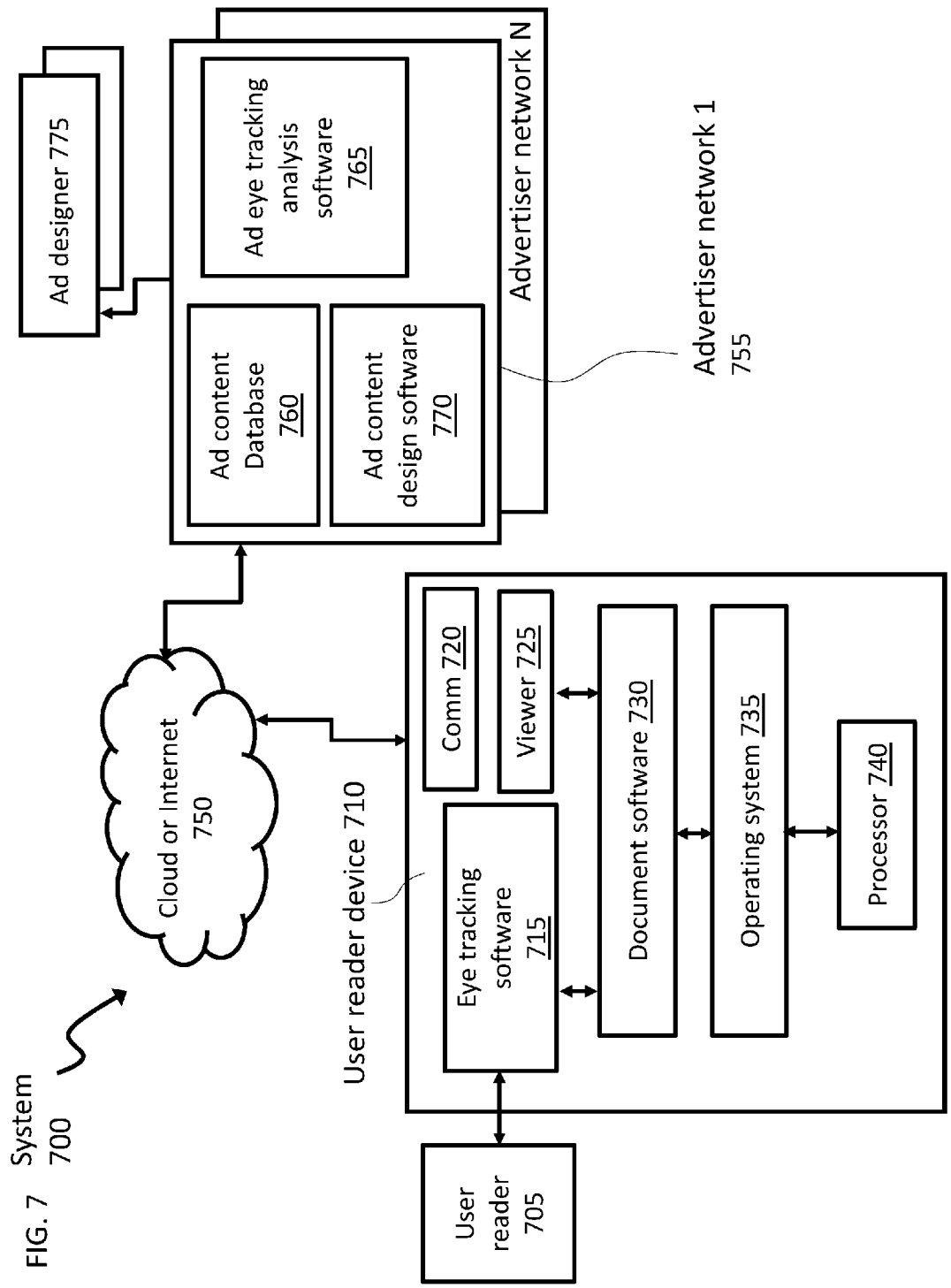
FIG. 7  System 700

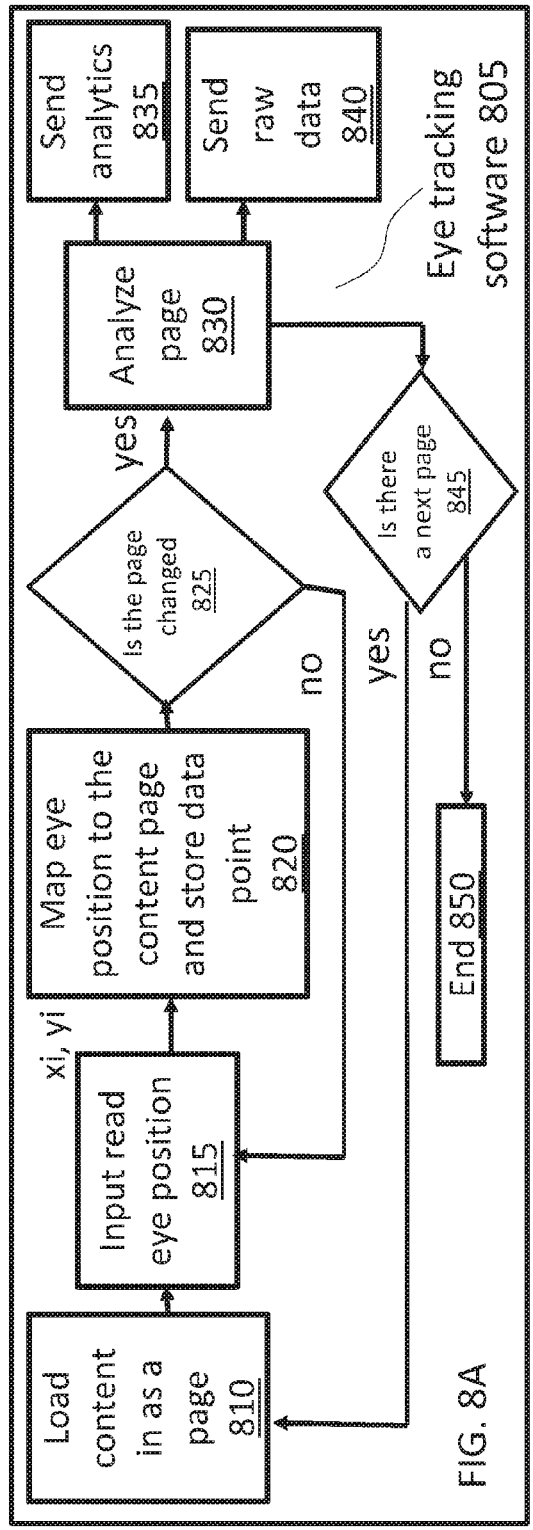
FIG. 8A
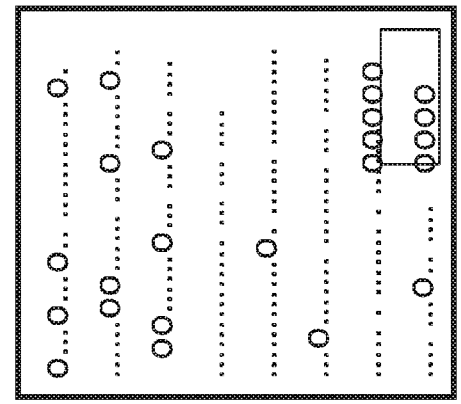
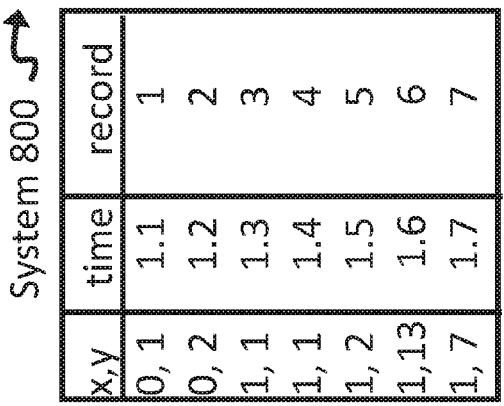
FIG. 8B
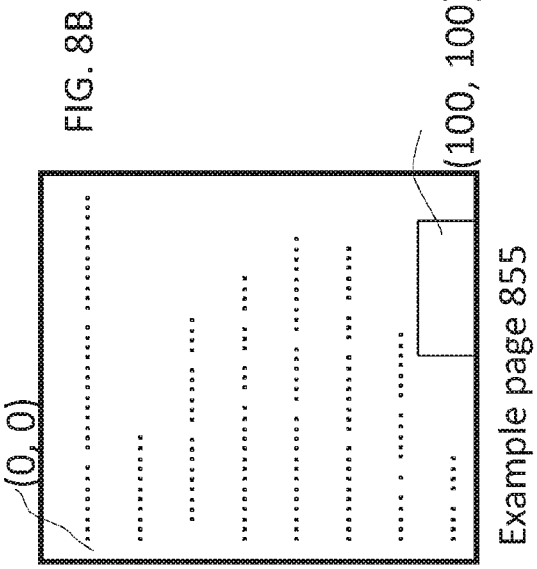

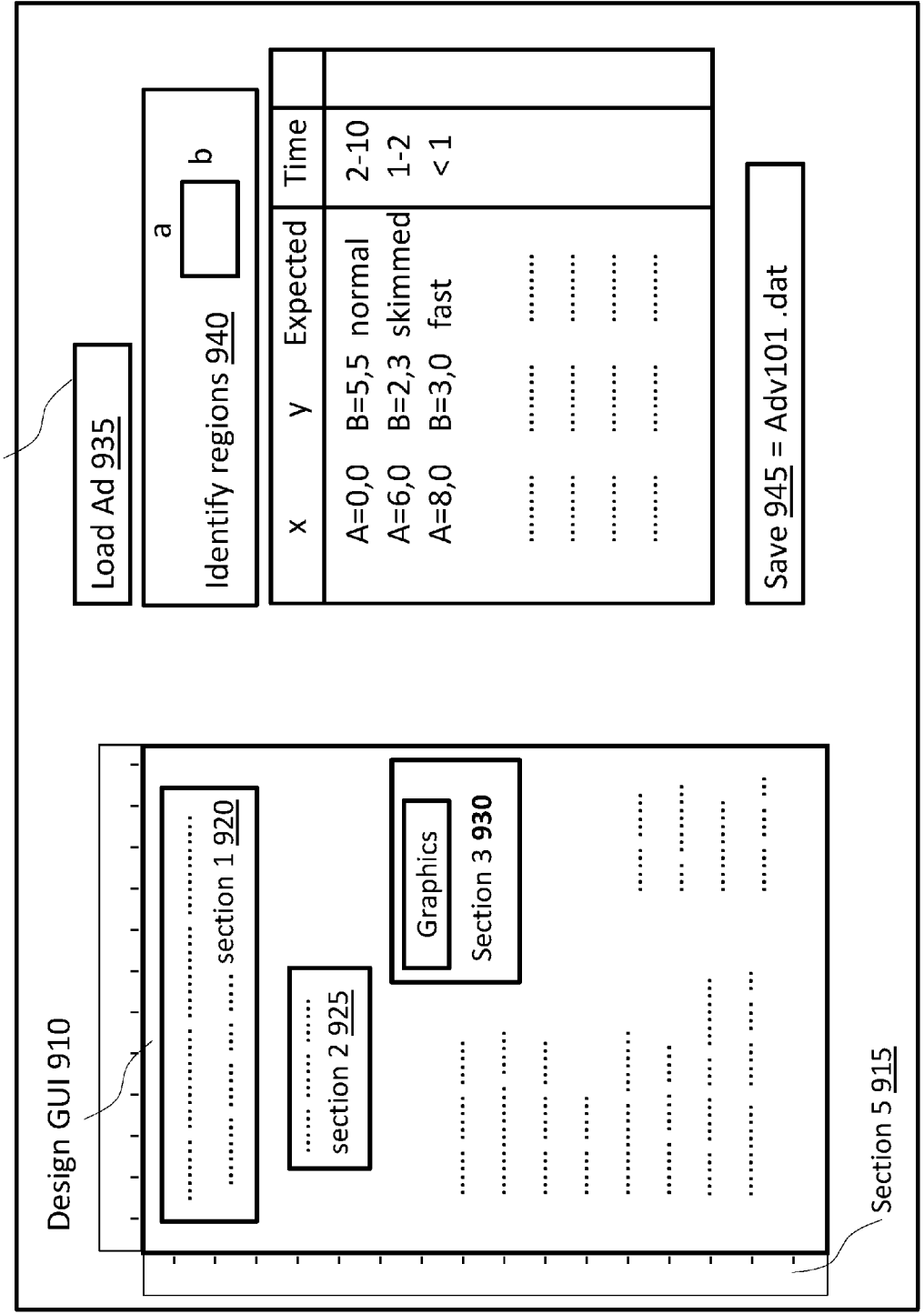
FIG. 9  Balthaser System 900

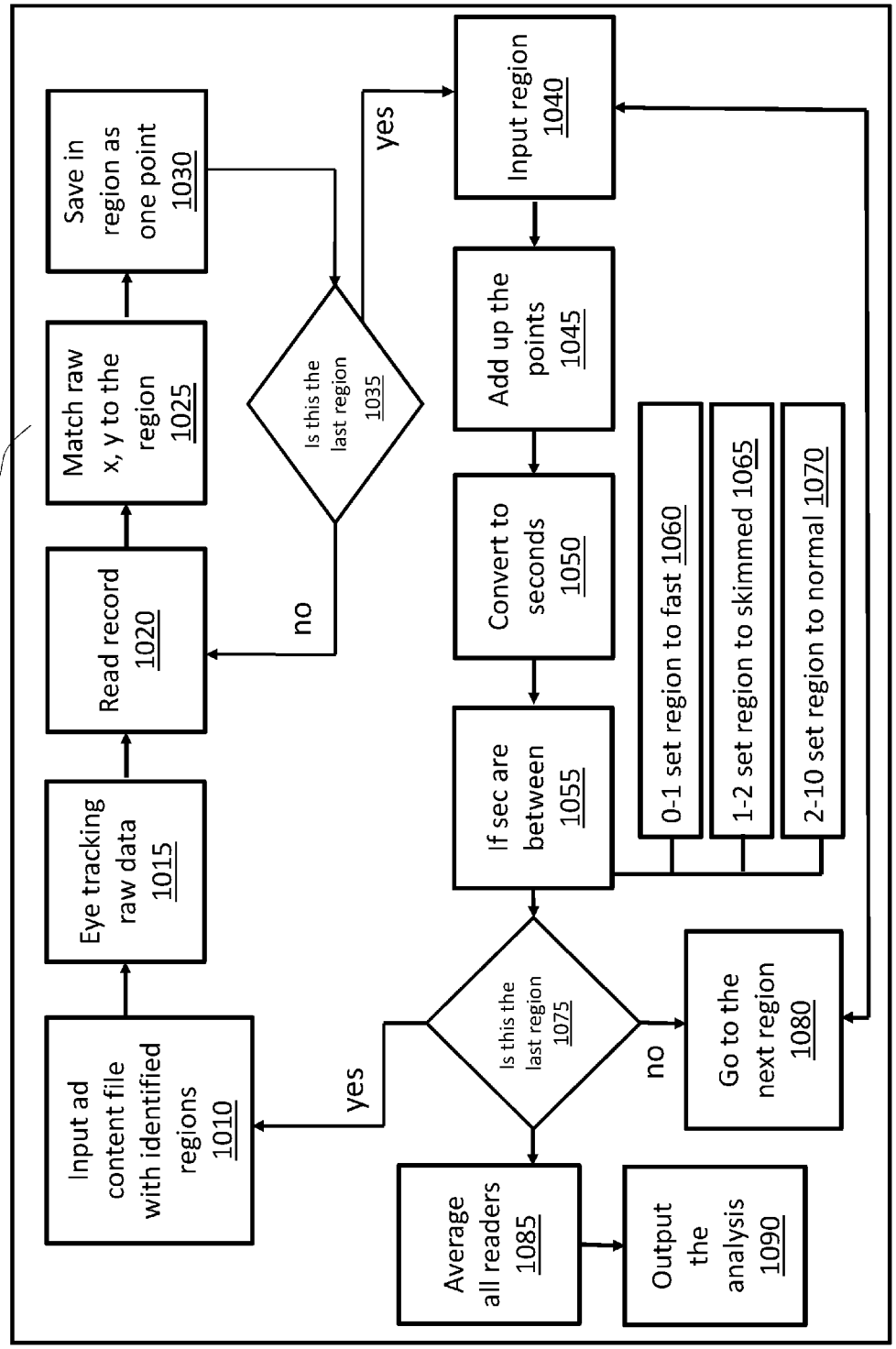
FIG. 10  Balthaser scheme 1000

Balthaser high level flow scheme 1100

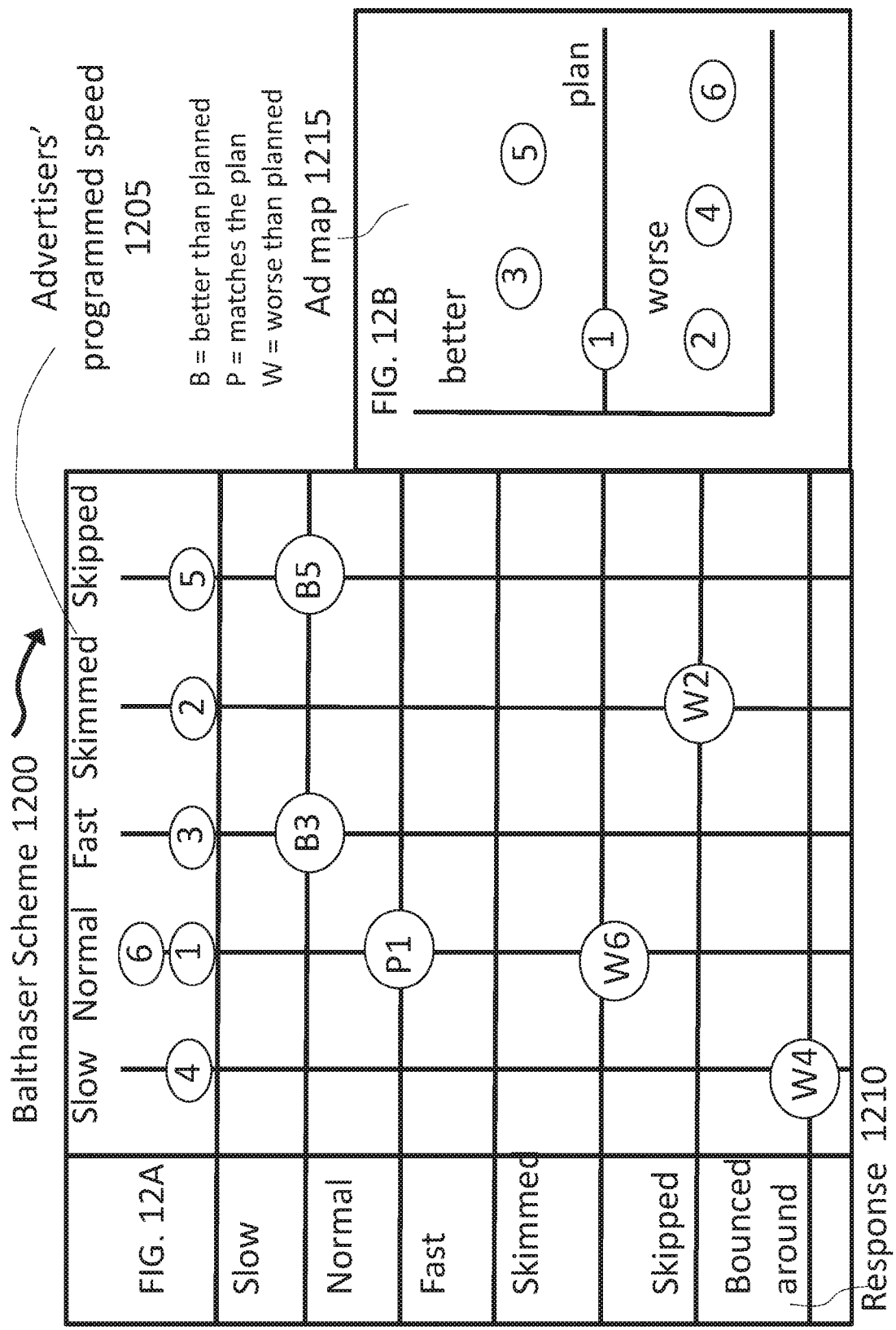

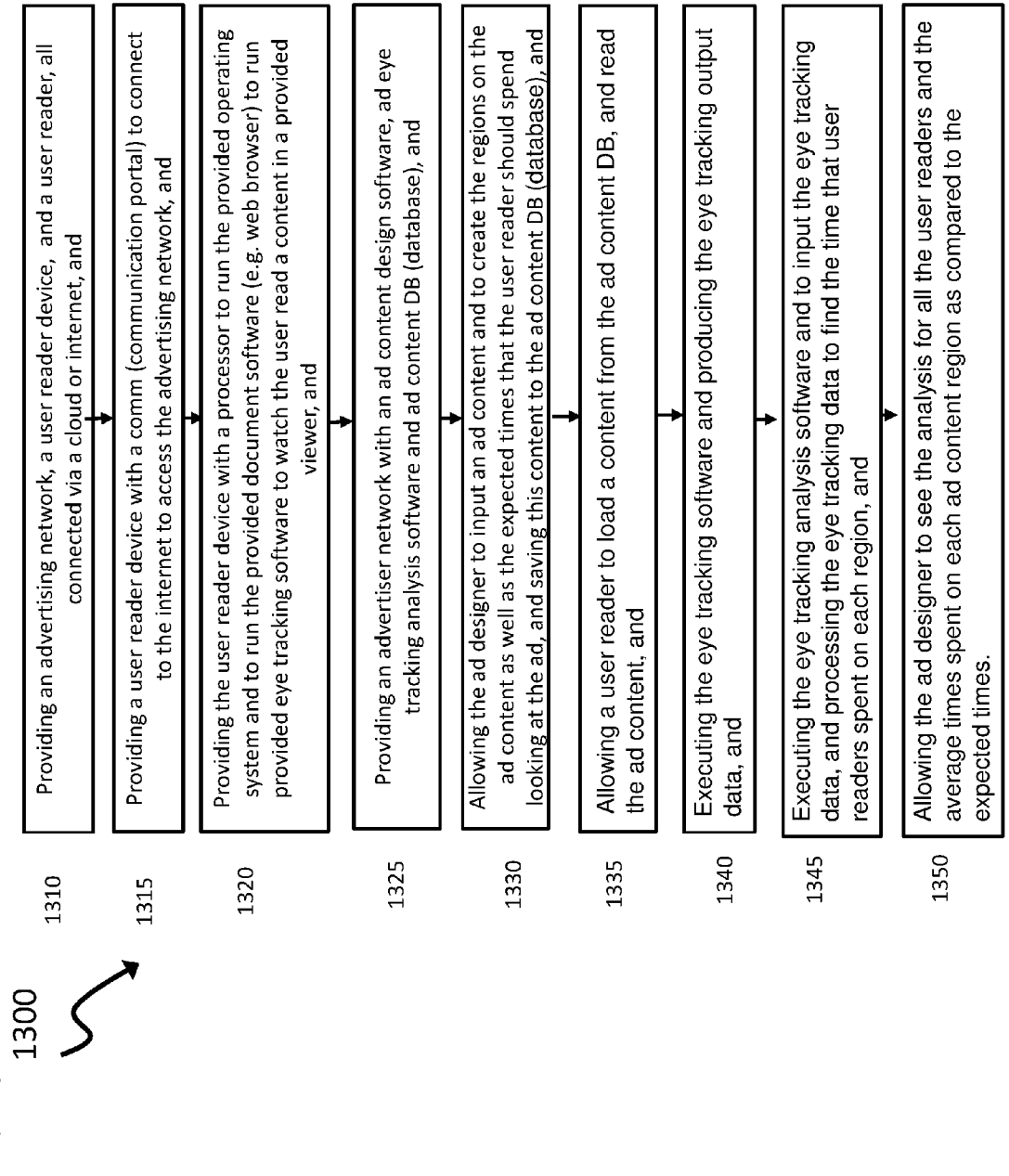
FIG. 13 Balthaser method Scheme 1300

SOCIAL MEDIA-BASED PUBLISHING AND FEEDBACK

BACKGROUND OF THE INVENTION

1. Field of the Invention

The present invention is generally related to providing electronic books to a group of readers. More specifically the present invention is related to receiving feedback regarding an electronic book from a plurality of readers that review the electronic book.

2. Description of the Related Art

Computers today are used to publish documents and books electronically. Currently users of electronic books (e-books) may share comments and highlighted text with other e-book users and users of e-books may also access metadata associated with an electronic publication from an external database. E-book users may also share information with other members of an e-book club.

Today, however, authors of e-books do not have the ability to received feedback from readers or reviewers before their e-book is published. What is needed are systems and methods that allow an author to provide an e-book to one or more reviewers/readers that may provide constructive feedback to the author regarding the content of the e-book.

Computers today also have limited ability to track eye motions of an individual reading a document displayed on a display at an electronic device. Computer systems equipped with eye tracking functionality do not collect information relating to specific content that is displayed in a portion of a display and use that information when interpreting whether certain specific content displayed on a display catches the interest of a reader. What is needed are systems and methods that collect information relating to eye motions of a reader when reading specific content that is displayed on a display and that identify whether the specific content caught the interest of a reader.

SUMMARY OF THE PRESENTLY CLAIMED INVENTION

The presently claimed invention relates to a system, method, and non-transitory storage medium where a version of an electronic book (e-book) may be reviewed by one or more reviewers before the e-book is published to the general public.

A method consistent with the presently claimed invention may receive feedback settings set by an author. The feedback settings may be entered by the author over a user interface at a computer. After the feedback settings are set the author may upload an e-book by transmitting the e-book over a computer network for storage. After the e-book has been uploaded, the e-book may be reviewed by one or more readers that may provide feedback to the author based on the feedback settings set by the author.

A method of the presently claimed invention may also be implemented as a non-transitory computer readable storage medium executable by a processor at a computing device. In this instance, the feedback settings may be entered by the author over a user interface at a computer. After the feedback settings are set the author may upload an e-book by transmitting the e-book over a computer network for storage. After the e-book has been uploaded, the e-book may be reviewed by one or more readers that may provide feedback to the author based on the feedback settings set by the author.

Systems and apparatus consistent with the presently claimed invention may include a display that displays a user interface over which one or more selections are received. Such a system may also include a communication interface over which the author may transmit and receive communications. Here again the feedback settings may be entered by the author over a user interface at a computer. After the feedback settings are set the author may upload an e-book by transmitting the e-book over a computer network for storage. After the e-book has been uploaded, the e-book may be reviewed by one or more readers that may provide feedback to the author based on the feedback settings set by the author.

BRIEF DESCRIPTION OF THE DRAWINGS

FIG. 6 is a block diagram of a device for implementing the present technology.

FIG. 7 illustrates an exemplary system consistent with an embodiment of the present disclosure.

FIG. 8A illustrates an exemplary method for tracking eye movement consistent with the present invention.

FIG. 8B illustrates several different types of information that may be displayed on a display at a user device.

FIG. 9 illustrates an exemplary system consistent with the present disclosure.

FIG. 10 illustrates an exemplary method consistent with eye tracking analysis software of the present disclosure.

FIG. 12A illustrates a first exemplary mapping of speed ratings that may be associated with a programmed speed rating, a measured speed response rating, and a plan rating.

FIG. 12B illustrates a second exemplary mapping of speed ratings that may be associated with a programmed speed rating, a measured speed response rating, and a plan rating.

FIG. 13 illustrates an exemplary overall method that according to the presently disclosure.

DETAILED DESCRIPTION

Systems, methods, and non-transitory computer readable storage mediums consistent with the present disclosure may include receiving feedback settings set by an author. The feedback settings may be entered by the author over a user interface at a computer. After the feedback settings are set the author may upload an e-book by transmitting the e-book over a computer network for storage. After the e-book has been uploaded, the e-book may be reviewed by one or more readers that may provide feedback to the author based on the feedback settings set by the author.

The e-books and other content discussed herein may include a variety of rich media, as well as traditional text or image content. Rich media, as used in the present disclosure, refers to content that may include not only text (i.e. words) or images (i.e. pictures) to convey information to the user, but may also include or utilize a variety of advanced features such as video and audio that encourages viewers to interact and engage with the content being viewed.

Figure 1A:
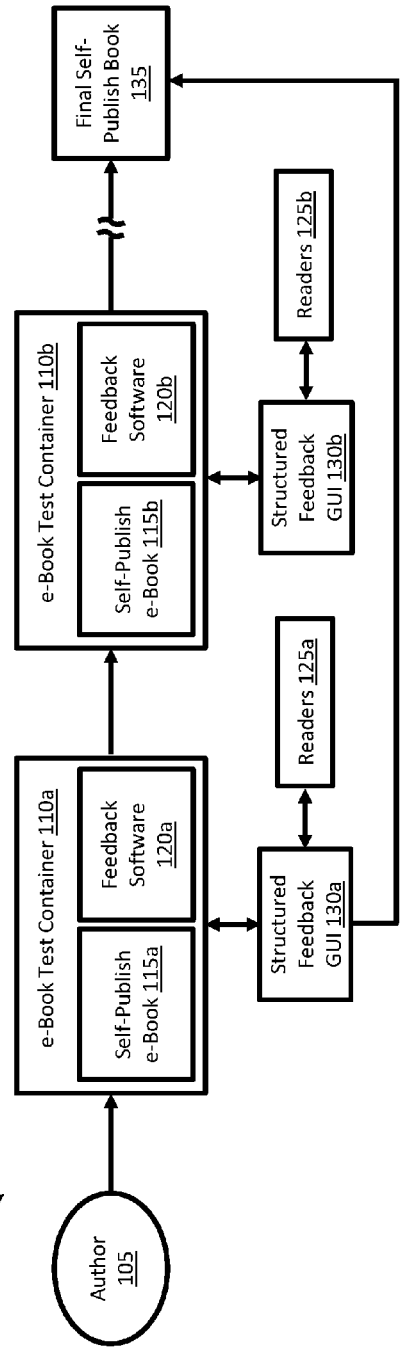
FIG. 1A illustrates an exemplary method consistent with the present disclosure where electronic books may be self-published by authors.

FIG. 1A illustrates an exemplary method consistent with the present disclosure where electronic books may be self-published by authors. The exemplary author/reader data flow 100 of FIG. 1A includes an author 105 interacting with an electronic book (e-book) test container 110a where the author 105 may self-publish an e-book 115a by uploading or drafting (creating) their e-book into the e-book test container 110a. After the author 105 has self-published their e-book 115a, feedback software 120a may receive feedback from readers 125a that have reviewed the e-book 115a. Readers 125a may provide feedback using a structured feedback graphical user interface (GUI) 130a. After receiving and reviewing the feedback from the readers 125a the author 105 may update their e-book in the e-book test container 110b. After updating their e-book, the author 105, may self-publish e-book 115b. After the updated e-book 115b is self-published feedback software 120b may receive feedback from readers 125b using the structured feedback GUI 130b. Finally after the e-book is complete, a final version of the e-book is self-published 135 to the general public.

In certain instances, readers 125a and 125b are individuals from a select group of reviewers. In such an instance only individuals designated as reviewers may have access to read a self-published e-book. After the final version of the e-book is self-published 135, members of the general public may purchase and read the final version of the e-book.

Figure 1B:
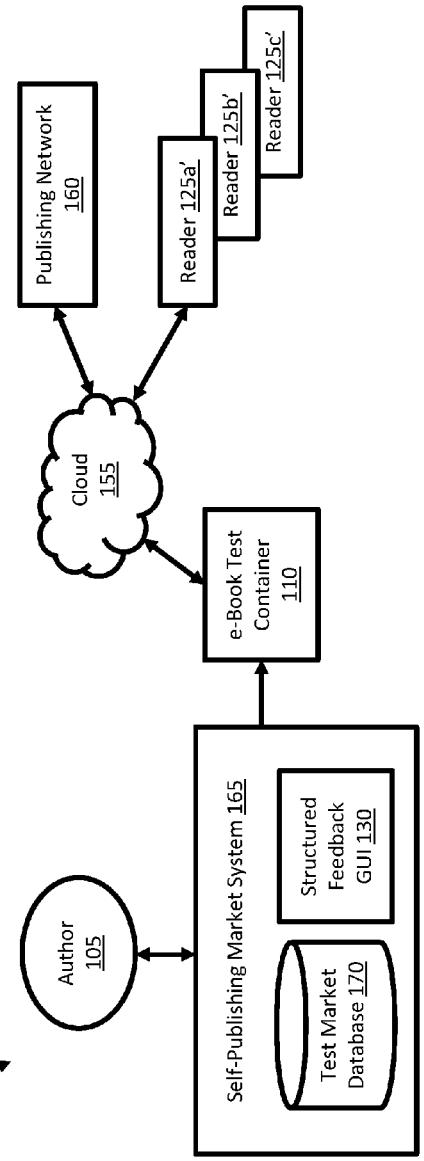
FIG. 1B illustrates an exemplary self-publishing test market system that may be used to produce and distribute self-published electronic books.

FIG. 1B illustrates an exemplary self-publishing test market system that may be used to produce and distribute self-published electronic books. Author 105 in FIG. 1B interacts with a self-published market system 165 when self-publishing an e-book using an overall self-publishing system 150. The self-publishing market system 165 includes a test market database 170 and a structured feedback GUI 130. The self-publishing market system 165 communicates with an e-book test container that may provide e-books to readers (125a', 125b', and 125c') and a publishing network 160 over the cloud or internet 155.

The self-publishing e-book market system 165 may include items that are not depicted in FIG. 1B, such as a memory, a processor, and a network communication interface. A network communication interface may be used to provide e-books over the cloud 155 to the publishing network or to computers operated by readers (125a', 125b', and 125c'). FIG. 1B also includes structured feedback GUI 130 over which feedback may be received.

Figure 2:
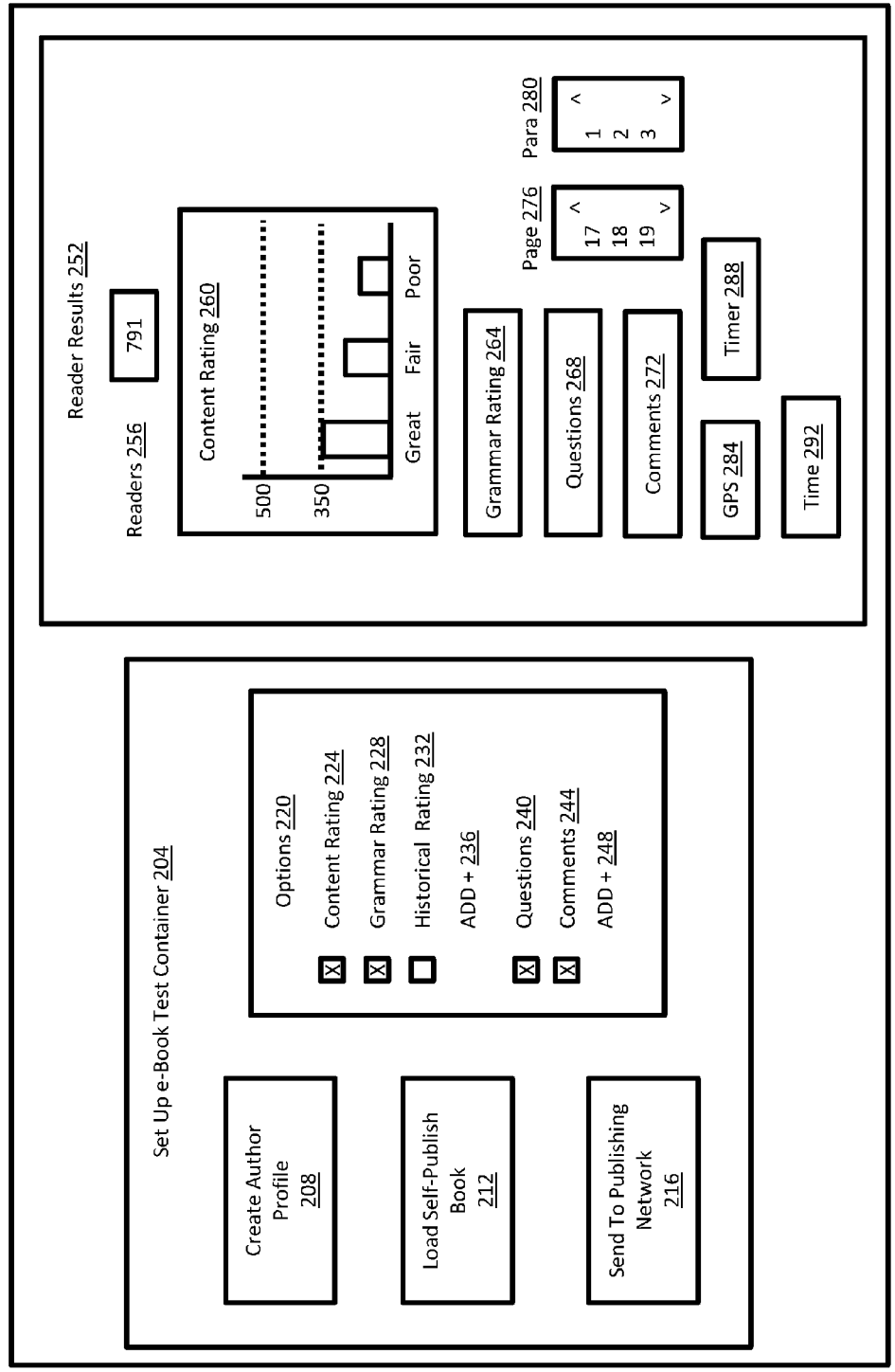
FIG. 2 illustrates an exemplary feedback graphical user interface that may be used by an author to structure feedback received from readers of a self-published electronic book.

FIG. 2 illustrates an exemplary feedback graphical user interface that may be used by an author to structure feedback received from readers of a self-published electronic book. The author structured feedback GUI 200 of FIG. 2 includes two major sections, a setup e-book test container 204 section, and a reader results 252 section. The setup e-book test container 204 includes a create author profile 208, a load self-publish book 212, and a send to publishing network selection box 216.

The setup e-book test container 204 of FIG. 2 includes options menu 220 that may be used to select types of feedback that may be received by a self-publishing market system. Options menu 220 includes check boxes that an author may select when the author desires to receive feedback relating to a content rating 224, a grammar rating 228, a historical rating 232, questions 240, and comments 248. The options menu 220 also includes add+selections 236 and 248 that may be selected by an author when the author wishes to add other feedback options to feedback menu 220.

The reader results 252 section of FIG. 2 includes various data presentation boxes where an author may see information that summarizes feedback received from readers of the e-book. The reader results 252 data presentation boxes include a readers 256 data presentation box that indicates that 791 readers have read or are currently reading an e-book. A content rating 260 data presentation box indicates that 350 readers have given the e-book a great rating, and that fewer than 350 readers have given either a fair or a poor rating to the e-book.

The reader results 252 section of FIG. 2 also includes various selection boxes that an author may select when they wish to review specific types of feedback received from readers. The selection boxes included in FIG. 2 include a grammar rating 264 box, a question 268 box, a comments 272 box, a global positioning system box (GPS), a timer 288 box, and a time 292 box. When one of these selection boxes is selected, another menu may be opened in a display at an electronic device operated by the author. For example, when the questions or comments selection boxes are selected, the author may view questions or comments received from readers on their display. When selection boxes of grammar rating 264, GPS 284, timer 288, or time 292 are selected, data relating to grammar ratings, GPS locations of readers, and reading times may be displayed on the author's display.

Finally the reader results 252 section of FIG. 2 also includes two scrolling selection boxes of page 276 and paragraph (para) 280. When an author selects a particular page and paragraph in the page 276 and the para 280 scrolling selection boxes, feedback data received from readers may be filtered to display feedback information relating to a selected page and paragraph on a user device.

Figure 3:
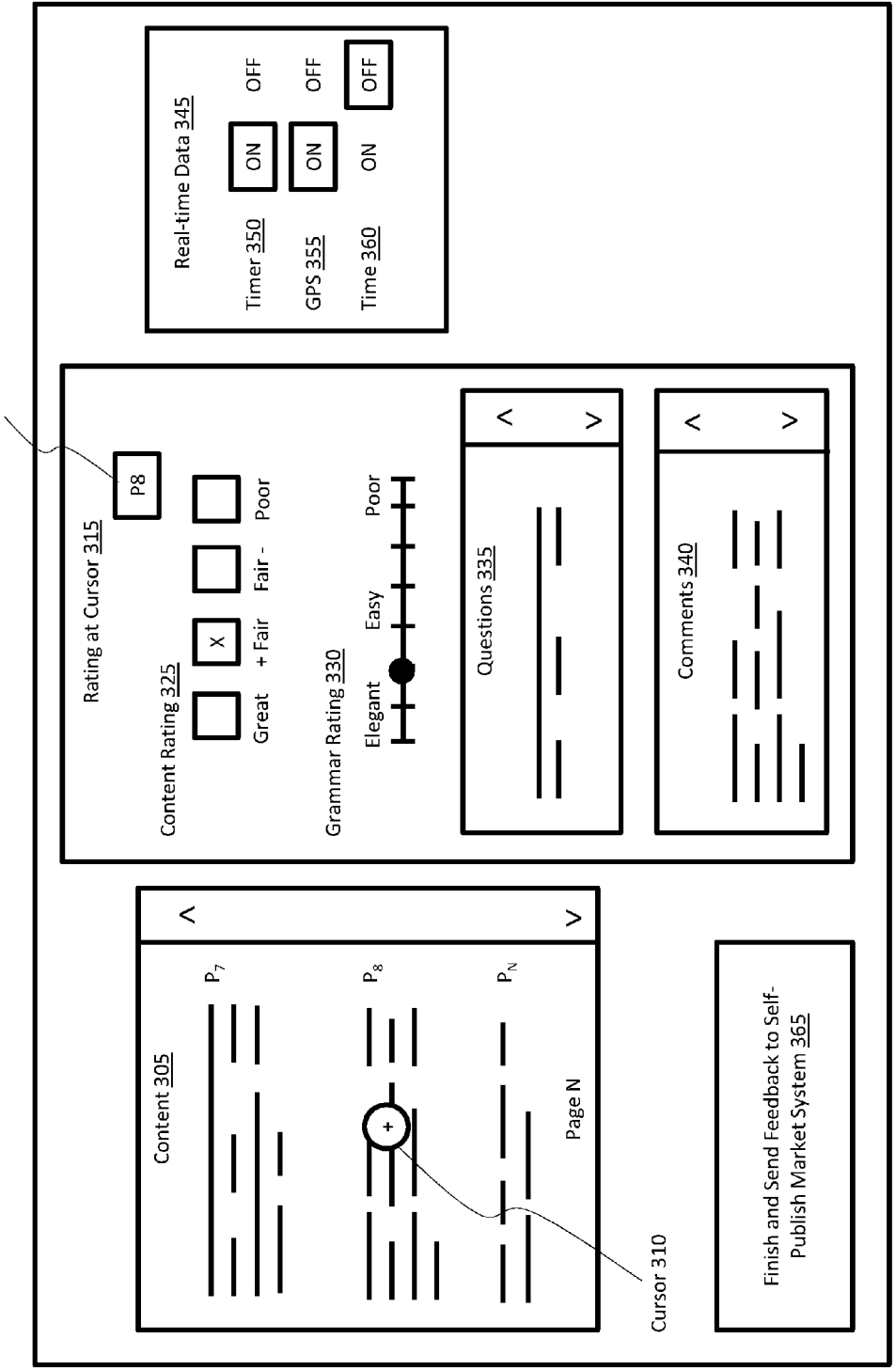
FIG. 3 illustrates an exemplary feedback graphical user interface that may be structured by a reader.

FIG. 3 illustrates an exemplary feedback graphical user interface that may be structured by a reader. The reader structured feedback GUI 300 of FIG. 3 includes a series of different sections that includes a content 305 section, a rating a cursor 315 section, and a real-time data 345 section. The content 305 section includes a sliding scale that may be used by a reader to scroll through text of an e-book. Paragraphs P7, P8, and PN of an e-book on page N are illustrated in the content 305 section of FIG. 3. Cursor 310 illustrated as a circle containing a cross identifies that the reader is reading a line of text in paragraph P8 on page N of the e-book. The reader may use the cursor to highlight portions of text and then enter feedback regarding the text highlighted by the cursor. Feedback entered may be reviewed by an author when the author is editing their e-book.

The rating at cursor 315 section of FIG. 3 includes a cursor position indicator 320, a series of content rating 325 check boxes, a grammar rating scale, a scrolling question entry box 335, and a scrolling comments entry box 340. The rating cursor position indicator identifies that the cursor position is currently located on paragraph eight P8. The content rating boxes 320 include great, +fair, fair–, and poor. FIG. 3 shows that the +fair selection box has been selected by the reader. The sliding grammar rating scale 330 indicates that the reader has rated the grammar with a rating between elegant and poor. The question entry box 335 and the comments entry box 340 of FIG. 3 may be used by a reader to enter questions and comments regarding the e-book. The reader may also scroll through the questions in the question entry box 335 or comments in the comments entry box 340 using the arrows on the right side of the scroll boxes.

FIG. 3 also includes a real-time data 345 section where a reader may turn timer 350, GPS functionality 355, and a time clock 360 on or off. Note that the timer 350 and GPS functionality 355 are turned on, and that the time clock 360 is turned off. When the timer 350 is on, data relating to how long a reader reads a portion of an e-book may be monitored and shared with an author or with others. When the GPS functionality 355 is on the GPS location of the reader may be collected and sent to the author. When the time clock 360 is on the time that a reader begins or ends reading an e-book may be sent to the author.

Finally FIG. 3 includes a finish and send feedback to self-publishing market system 365 selection box. When this selection box is selected by a reader, information relating to the cursor 310, the content rating 325, the grammar rating 330, questions 335, and comments 340 may be sent to the self-publishing market system 365. When selection box 365 is selected, information relating to the timer 350, GPS 355, or the time 360 may be sent to the self-publishing market system according to the real-time data 345 settings. As such, structured feedback GUI 300 may be used by an author when identifying types of feedback that an author wishes to review or collect.

Figure 4:
FIG. 4 illustrates an exemplary table of information that may be stored in a market database of self-publishing market system.

FIG. 4 illustrates an exemplary table of information that may be stored in a market database of self-publishing market system. The market database table 400 of FIG. 4 includes columns headers of an identifier (ID) 405, an author 410, a book file 415, a reader 420, a content rating 425, a grammar rating 430, a history rating 440, a comment file 445, and real time data 450. A first row of the table indicates that an ID of 17 corresponds to an author John XYZ and an e-book of winter.doc. This first row indicates that reader number 517 has rated the winter.doc book as being a "fair" book, and that the reader has rated grammar in the e-book as being "great." Reader 517 has also included questions stored in question file Q17517.dat, comments stored in comment file C17517.dat, and real time data store in file R17517.dat. Note also that readers 521 and 535 have provided their own ratings and data files. The market database table 400 of FIG. 4, thus, includes information relating to data collected from a plurality of readers that the author may review when updating their book. The data collected may be collected from a plurality of different readers reading different e-books. As such, the market database may be used when identifying e-books that have greater potential commercial value. Where e-books with a greater potential market value may be identified and presented in a user interface to potential customers through an advertisement provided in a GUI, through emails/other messages to prospective customers, or by other means.

Figure 5:
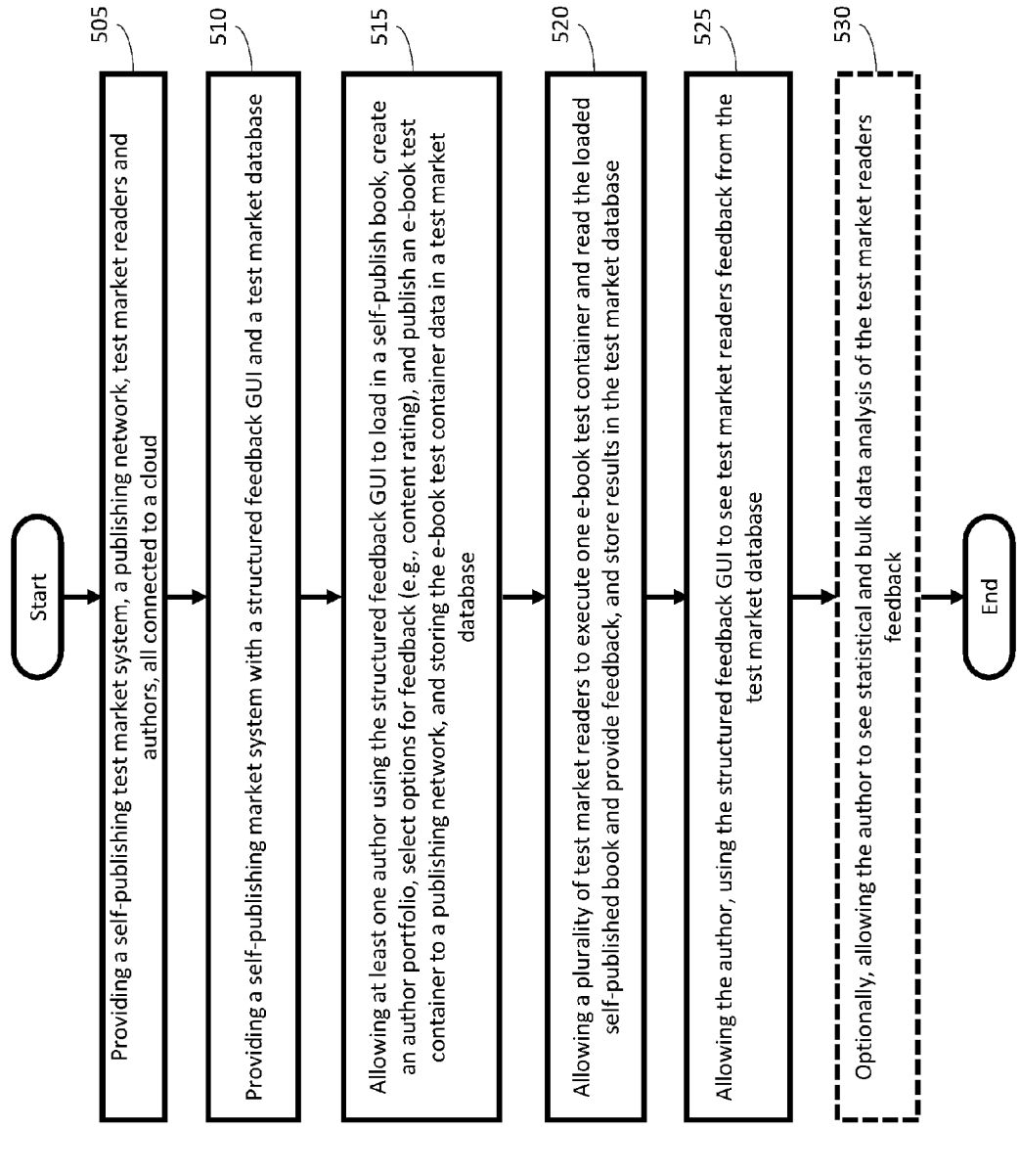
FIG. 5 illustrates an exemplary method consistent with the present disclosure.

FIG. 5 illustrates an exemplary method consistent with the present disclosure. The method 500 of FIG. 5 begins with step 505 where a self-publishing test market system is provided with a publishing network, a number of test market readers, and authors. Next in step 505 the self-publishing market system is proved with a structured feedback GUI and with a test market database. Then in step 515 an author is allowed to self-publish a book on a publishing network, create a portfolio of the author's work, select options for reader feedback. Books published by the author may be store an e-book test container in a test market database. The e-book test container may be a file in the test market database.

After step 515, the method moves to step 520 where a plurality of test market readers are allowed to read and provide feedback on an e-book. These readers may also send their feedback to the test market database. In certain instances the readers are readers selected specifically for providing feedback on a book before it is published to the general public.

In certain other instances the readers may be professionals that review confidential materials before they are published. In these instances the readers may have signed non-disclosure agreements. The documents posted to a self-publishing market system confidentially so that they may be legally considered "not published" by entities such as the United States Patent and Trademark Office (USPTO). E-books uploaded to the self-publishing market system may also be encrypted and a reader may require decryption keys to read the e-book. Readers or authors may also have to login to the self-publishing system or provide biometric information that identifies them before having access to an e-book. A system consistent with the presently disclosed invention may include security settings. Such security settings may require a reader or author login, a reader or author biometric input, a confidentiality agreement, encryption, or include a setting that posts a confidentiality statement in a header/footer of an e-book.

Step 525 in the method 500 of FIG. 5 allows an author to seed feedback provided by readers. That feedback may have been provided over a structured feedback GUI where feedback information may be stored in a test market database at the self-publishing test market system. Finally optional step 530 allows an author view statistical and bulk data collected from the plurality of test market readers.

In certain instances readers providing feedback to authors may do so for no compensation. In other instances readers may be paid for providing feedback to an author. When an author wishes to pay a reader for providing feedback, the author may enter one or more selections in a GUI that initializes a payment system according to settings set by the author.

FIG. 6 is a block diagram of a device for implementing the present technology. FIG. 6 illustrates an exemplary computing system 600 that may be used to implement a computing device for use with the present technology. System 600 of FIG. 6 may be implemented in the contexts of the likes of clients and servers. The computing system 600 of FIG. 6 includes one or more processors 610 and memory 620. Main memory 620 may store, in part, instructions and data for execution by processor 610. Main memory can store the executable code when in operation. The system 600 of FIG. 6 further includes a storage 620, which may include mass storage and portable storage, antenna 640, output devices 650, user input devices 660, a display system 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the storage 630, peripheral device(s) 680 and display system 670 may be connected via one or more input/output (I/O) buses.

Storage device 630, which may include mass storage implemented with a magnetic disk drive or an optical disk drive, may be a non-volatile storage device for storing data and instructions for use by processor unit 610. Storage device 630 can store the system software for implementing embodiments of the present invention for purposes of loading that software into main memory 610.

Portable storage device of storage 630 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device.

Antenna 640 may include one or more antennas for communicating wirelessly with another device. Antenna 640 may be used, for example, to communicate wirelessly via Wi-Fi, Bluetooth, with a cellular network, or with other wireless protocols and systems. The one or more antennas may be controlled by a processor 610, which may include a controller, to transmit and receive wireless signals. For example, processor 610 execute programs stored in memory 620 to control antenna 640 transmit a wireless signal to a cellular network and receive a wireless signal from a cellular network.

The system 600 as shown in FIG. 6 includes output devices 650 and input device 660. Examples of suitable output devices include speakers, printers, network interfaces, and monitors. Input devices 660 may include a touch screen, microphone, accelerometers, a camera, and other device. Input devices 660 may include an alpha-numeric keypad, such as a keyboard, for inputting alpha-numeric and other information, or a pointing device, such as a mouse, a trackball, stylus, or cursor direction keys.

Display system 670 may include a liquid crystal display (LCD), LED display, or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

FIG. 7 illustrates an exemplary system consistent with an embodiment of the present disclosure. The system 700 of FIG. 7 includes a user 705, a user device 710, the cloud or Internet 750, Advertiser networks (1-N) 755, and ad designers 775. Advertiser network 1 755 includes and ad content database 760, ad eye tracking software 765, and ad contend design software 770.

The user reader device and advertiser networks 755 may communicate with each other over the cloud or Internet 750. The user device 710 includes eye tracking software 715, a communication (comm) interface 720, a viewer 725, document software 730, operating system software 735, and a processor 740. Advertiser networks 1-N 755 may communicate with ad designers that produce advertisements that may be uploaded to the ad content database 760. As such the eye tracing software 715 may track the eye movement of a reader when identifying a portion of text currently being read by the reader. Advertiser network 755 may also use such information when identifying advertising content to present to a reader based on material identified as "of interest" to a reader or user.

FIG. 8A illustrates an exemplary method for tracking eye movement consistent with the present invention. The eye tracking software 805 of system 800 begins with step 810 where a page of content is loaded into memory and displayed on a display. Content may be a page of an e-book or may include any form of digital content such as video, photos, or a webpage. Next in step 815 the position of a user's eye is read (sensed) using one or more sensors at or in communication with a computing device. Step 820 may then identify using the one or more sensors an X and a Y position of where the user's eyes are focused on a point. In certain instances the X and Y position of the user's eyes may correspond to the cursor position 310 of FIG. 3.

Determination step 825 identifies whether the user has changed the content displayed on the display. Step 825, for example may identify that the user has scrolled to another page of a document. When the user has not changed the content displayed on the display, program flow moves back to step 815 where the eye position of the user is read again. When the user has not changed the page in step 825, program flow moves to step 830 where the page may be analyzed. Step 830 may allow users to interact with a reader structured feedback GUI as described in respect to FIG. 3. After step 830, program flow may move to step 835, 840, or to decision step 845.

Step 835 may send analytic data from the user computing device to a publishing network of FIG. 1B or to an advertiser network of FIG. 7. Step 840 may send raw data, such as cursor data or a page and paragraph number currently being read by a user from the user computing device to the publishing network of FIG. 1B or to the advertiser network of FIG. 7. Determination step of FIG. 845 determines whether a next page should be displayed on the user display, when yes, program flow moves back to step 810 where content is loaded and displayed on a display at the user computing device. When step 845 identifies that there is not another page to display, program flow ends in step 850.

FIG. 8B illustrates several different types of information that may be displayed on a display at a user device. Example page 855 in FIG. 8B includes text (illustrated as a series of dots) and a box displayed on the display. Locations (0,0) and (100, 100) in example page 855 are X/Y locations on the page where location (0,0) is in the upper left side of the page and (100, 100) is located in the lower right corner of the page. The box in example page 855 may correspond to a cursor position mapped in step 820 of FIG. 8A.

A second type of information is presented in a table of raw data 860 in FIG. 8B. The table of raw data 860 that may be displayed on a display at a user device. Raw data 860 includes columns X/Y, time, and record. Raw data table 860 cross-references an X/Y location, a record, and with a time that a user may have spent reading a particular record or a time that a user may be allocated for reading a record. Note that X/Y location 0,1 is associated with record 1 and with a time of 1.1 seconds, and that X/Y location 1, 13 is associated with record 6 and with a time of 1.6 seconds. In certain instances a reading time of a particular record may be rated with a rating speed. Exemplary speed ratings may include normal, skim, and fast. Rating speeds may be associated with an average time that a typical person is expected to read a particular record. As such, records may be of different lengths and include different amounts of content, including yet not limited to text, video, photos, advertisements, or a webpage. Records may include one or more pages of information or may include a portion of a page.

FIG. 8B also includes an exemplary eye position map 865 that includes dots representing text and circles representing portions of text that are associated with an analysis. The eye position map 865 of FIG. 8B also includes a box that may correspond to a cursor position where the eyes of a user are currently focused. Analyzed portions of text may correspond to a record, a reading time, and an X/Y position.

FIG. 9 illustrates an exemplary system consistent with the present disclosure. The system 900 of FIG. 9 includes a design GUI 910, a local ad 935, identified regions 940, and a save 945 selection box. The design GUI of FIG. 9 may be used by a designer when creating content. Notice that design GUI 910 includes section 1 920, section 2 925, a section 2 930, and section 5 915. Each of these sections may correspond to a record where raw data may be collected and analyzed. Here again dots represent text. Notice that section 3 930 includes graphics information that may include photos or video. Data may be collected relating to how long a user reads a particular section or record displayed on a display. In the instance where a section includes an advertisement, information relating to how long a person focuses on that section may be used to judge how effective that advertisement is. For example, if a person were to spend 10 seconds reading local ad 935, that ad may be judged "effective." In certain instances a display box a/b may display a region 940 of a page that a user is currently reading. FIG. 9 also includes a table of data that cross references X/Y locations, speed ratings, and reading times. Notice that times less than 1 second are rated fast, times between 1 and 2 seconds are rated fast, and times between 2-10 seconds are rated as normal. Here again X/Y locations, times, and ratings may be used when collecting data about digital content displayed on a display. Raw data and analysis data may be saved 945 in data file ADV101.dat. In certain instances data file ADV101.dat may be sent to an advertiser network.

FIG. 10 illustrates an exemplary method consistent with eye tracking analysis software of the present disclosure. In the scheme 1000 of the eye tracking analysis software 1005 a program may begin with step 1010 where an advertiser content may be displayed (input) on a display. This advertiser content may have been created by a designer and may have been downloaded to a user device for display. The advertiser content may include one or more regions that may be identified in step 1010. Next in step 1015, raw data relating to where a user's eyes are focused on a display may be sensed. Next in step 1020, eye tracking data may be stored in a memory (recorded), next in step 1025 the raw data may be matched to an X/Y location, and in step 1030 the X/Y data may be saved in the memory.

After step 1030, program flow moves to step 1035 that identifies whether the current region is a last region displayed on the display, when no, program flow moves bay to step 1020 where the stored data may be updated. The last region may be a region of a plurality of regions that have been displayed sequentially on a display to a reader. When step 1035 identifies that a current record is not a last record, program flow moves to step 1040 that may display a new region on the display.

Next in step 1045 incremental points of time may be added up and then those points may be converted in to seconds. In such an instance the incremental points may be associated with a measure of discrete time that corresponds to a sample rate of a user's eye motion. For example, when eye motions are measured every 1/10 of a second (0.10 seconds) and a number of points equal 9, then an approximate time that the user read a particular region would be 0.9 seconds. After step 1045, program flow moves to step 1055 that cross references a time to a speed rating. Note that a time of 0-1 second corresponds to a fast 1060 speed rating, that a time of 1-2 seconds corresponds to a skimmed 1065 speed rating, and that a time of 2-10 seconds corresponds to a normal 1070 speed rating.

After step 1055 program flow moves to step 1075 that determines whether that last region has been read, when no, program flow moves to step 1080 where a next region is retrieved and then displayed in step 1040. When it is identified that the last region has been read, program flow may move back to step 1010 where another piece of content may be loaded (input) into memory for display. Step 1075 may also move to step 1085 where data may be analyzed and averaged for a plurality of users. Finally, step 1090 outputs the analysis performed in step 1085. Analysis data may be stored in a database at an advertiser network.

Figure 11:
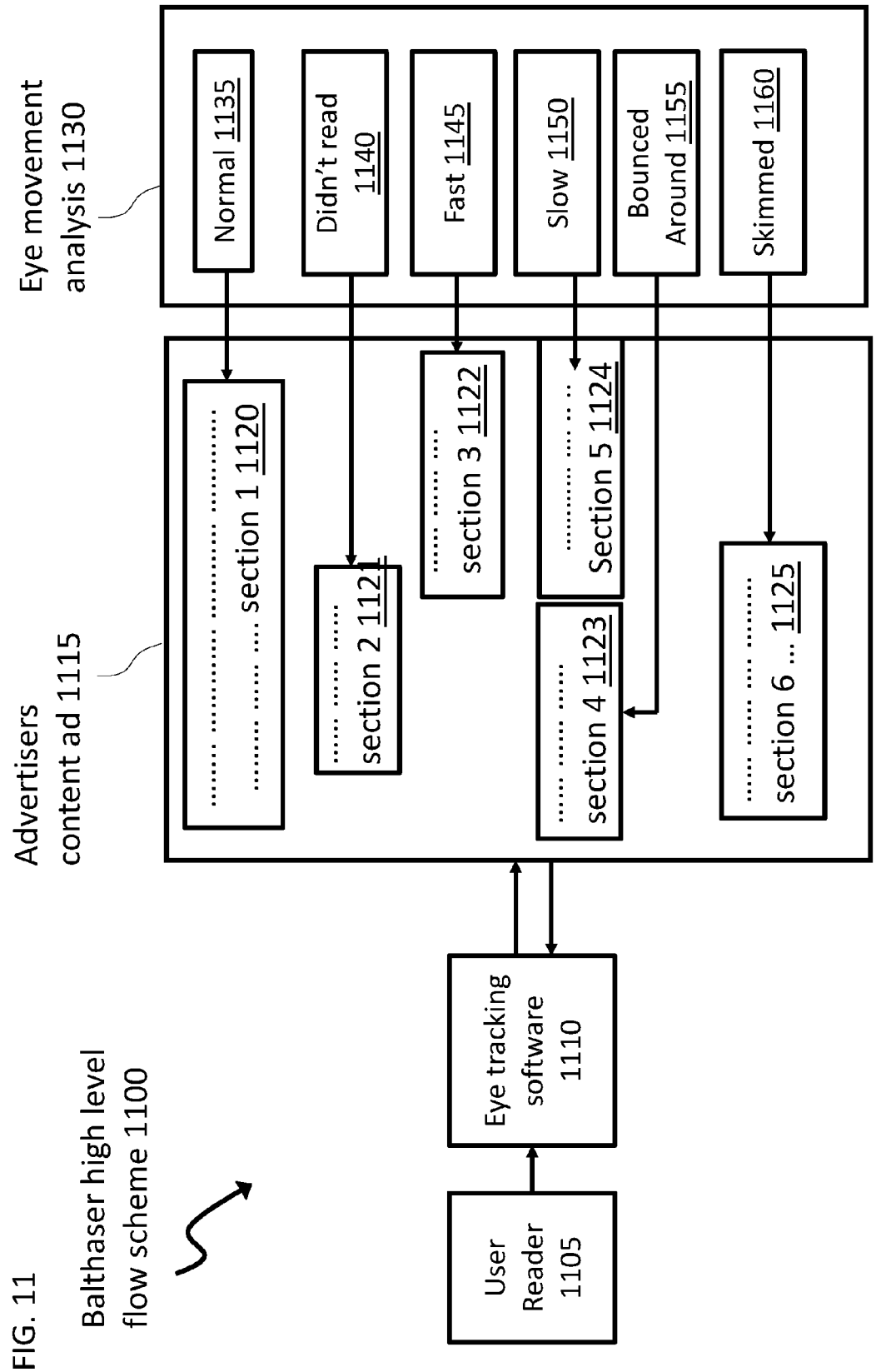
FIG. 11 illustrates an exemplary instance where a user's eye movement may be analyzed when the user is reading advertiser content.

FIG. 11 illustrates an exemplary instance where a user's eye movement may be analyzed when the user is reading advertiser content. When user 1105 reads advertiser content 1115, eye tracking software may be used to collect and analyze the user's eye movement. A rating may be associated with each section of text displayed on a display. Eye movement analysis software 1130 may associate section 1 1120 with normal speed rating 1135, section 2 1121 may be associated with a rating that indicates that the user did not read 1140 section 2 1121, and section 3 1122 may be associated with fast speed rating 1145. Similarly, section 4 1123 may be associated with a bounced around rating 1155, section 5, 1124 may be associated with a slow 1150 rating, and speed rating, skimmed 1160, may be associated with section 6 1125 of the advertiser contend 1115. The bounced around rating 1155 may indicate that the user did not read section 4 1123, it may indicate that a user only glanced at portions of section 4 1123. A bounced around speed rating may be indicate that a user was not significantly interested in reading a section.

FIG. 12A illustrates a first exemplary mapping of speed ratings that may be associated with a programmed speed rating, a measured speed response rating, and a plan rating. The scheme 1200 of FIG. 12A includes an advertisers' programmed speed rating 1205. The advertiser's programmed speed rating 1205 includes programmed ratings of slow, normal fast, skimmed, and skipped along a horizontal axis. Measured speed response rating 1210 along a vertical axis. Speed response ratings 1210 include slow, normal, fast, skimmed, skipped, and bounced around.

Notice that section 4 has an advertiser programmed speed rating of slow, that sections 1 and 6 have a programmed speed rating of normal, that section 2 has a fast programmed speed rating, and that section 5 has a skipped program speed rating.

FIG. 12A cross references a programmed speed rating with a measured speed response rating. Here a B rating (i.e. B3 and B4) may indicate better than planned performance, a P rating (i.e. P1) indicates that measured ratings agree with a program rating according to a plan, and that a W rating (i.e. W4, W6, and W2) indicates that the measured ratings a worse than the program ratings. Note that section 4 is associated with W4 a worse rating because the advertiser expected that the user would read section 4 slowly when their eyes bounced around section 4 without slowly reading it. Similarly, section 6 and section 2 are associated with worse ratings W6 and W2. This is because readers skimmed section 6 when it had a programmed rating of normal, and readers skipped section 2 when it had a programmed rating of skimmed. Not also that sections 1 and 5 have a according to plan P1 rating and a better rating B5. This is because section 1 has a programmed rating of normal and a measured read rating approaching normal, and section 5 has a programmed rating of skipped when a reader read it more slowly.

FIG. 12B illustrates a second exemplary mapping of speed ratings that may be associated with a programmed speed rating, a measured speed response rating, and a plan rating. FIG. 12B shows an advertiser map 1215 that includes a vertical axis ranging from worse to better. The horizontal line between better and worse indicates the programmed level relative to each section. Note as in FIG. 12A section 2, 4, 6 have worse ratings than programmed by an advertiser. Note also that as in FIG. 12A section 1 is according to plan, and sections 3 and 5 have measured ratings better than the plan. FIG. 12B is a mapping that may show the same information as illustrated in FIG. 12A, yet in a different format.

FIG. 13 illustrates an exemplary overall method that according to the presently disclosure. Step 1310 provides an advertiser network and a user reader device with the ability to connect and communicate with each other over the cloud or Internet.

Step 1315 provides the user reader device with a communication portal that the user reader device may use to access the advertising network over the cloud or Internet. Next, step 1320 provides a user reader device with a processor, an operation system, document software, eye tracking software, and content that may be displayed in a viewer (display) at the user electronic device.

Then step 1325 may provide an advertiser network with ad content, design software, eye tracking analysis software, and with a content database. Step 1330 may allow an ad designer to create content for display on a user display. The designer may create various sections, identify expected times that a reader should read a particular section, and the designer may save their content/advertisements in a database at the advertisers' network.

Next step 1335 may allow a user to download content from the database at the advertisers' network and the user may be allowed to read the downloaded content on a user display. Step 1340 initiates eye tracking software that allows a user reader device to track the eye movement of a user reading the content with one or more sensors. Then step 1345 eye tracking analysis software may execute on a processor at the user reader device or at the advertiser network. The analysis software may generate speed ratings from measured raw data and may associated the speed rating with a measure of better than plan, according to plan, or worse than planned by comparing the ratings associated with measured data with advertiser programmed ratings. Here again an amount of time may be measured for each section displayed on a display at the user reader device. In the instance where the eye tracking software executes at the advertisers' network, raw data from the user reader device may be received by the advertisers' network over the cloud or Internet.

Finally step 1350 allows an ad designer to see analysis data for all user's that are reading content, the ad designer's may also view raw data or other data output from the eye tracking analysis software. The designers may then modify ad content when attempting to increase the amount of time a user spends on a particular advertisement.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for a providing a document electronically to one or more readers for review, the method comprising:
receiving one or more reader settings set by an author over a user interface displayed at a computing device, wherein at least one of the reader settings specifies that at least a portion of an uploaded electronic book is to be encrypted;
encrypting the specified portion of the uploaded electronic book in accordance with an encryption key;
transmitting the encrypted portion of the electronic book over a network interface at the computing device to at least one reader device, wherein decryption of the encrypted portion by the reader device requires a decryption key corresponding to the encryption key;
receiving eye tracking data collected by at least one sensor at the reader device after the decrypted portion is displayed at the reader device;
identifying that the received eye tracking data indicates a plurality of focal points directed at a subset of content within the display of the transmitted portion at the reader device;
receiving feedback data from the reader device in association with the subset of content; and
generating a display of the electronic book at the computing device, wherein the generated display further includes the feedback data and indicates the focal points in association with the subset of content.

2. The method of claim 1, wherein the reader settings further require biometric authentication at the reader device before the transmitted portion is displayed.

3. The method of claim 1, wherein the received feedback includes at least one of a content rating, a grammar rating, a question, and a comment.

4. The method of claim 1, wherein the received feedback includes real-time data collected at the reader device, and the real-time data including information relating to at least one of a time and a location identified by a global positioning system (GPS) at the reader device.

5. The method of claim 1, further comprising transmitting an indication that the portion of the electronic document includes confidential information to the reader device, wherein the indication is displayed when the portion is displayed on the display at the reader device.

6. The method of claim 1, further comprising:
receiving modifications to the portion of the electronic book over the user interface at the computing device; and
transmitting at least the received modifications to the portion of the electronic book over the network interface at the computing device.

7. The method of claim 1, further comprising transmitting an advertisement for display on the display at the reader device, the advertisement associated with the electronic book, wherein the received eye tracking data is analyzed to identify whether and how long the reader focused on the advertisement.

8. A non-transitory computer readable storage medium having embodied thereon a program executable by a processor for performing a method for a providing a document electronically to one or more readers for review, the method comprising:
receiving one or more reader settings set by an author over a user interface displayed at a computing device, wherein at least one of the reader settings specifies that at least a portion of an uploaded electronic book is to be encrypted;
encrypting the specified portion of the uploaded electronic book in accordance with an encryption key;
transmitting the encrypted portion of the electronic book over a network interface at the computing device to at least one reader device, wherein decryption of the encrypted portion by the reader device requires a decryption key corresponding to the encryption key;
receiving eye tracking data collected by at least one sensor at the reader device after the decrypted portion is displayed at the reader device;
identifying that the received eye tracking data indicates a plurality of focal points directed at a subset of content within the display of the transmitted portion at the reader device;
receiving feedback data from the reader device in association with the subset of content; and
generating a display of the electronic book at the computing device, wherein the generated display further includes the feedback data and indicates the focal points in association with the subset of content.

9. The non-transitory computer readable storage medium of claim 8, wherein the reader settings further require biometric authentication at the reader device before the transmitted portion is displayed.

10. The non-transitory computer readable storage medium of claim 8, wherein the received feedback includes at least one of a content rating, a grammar rating, a question, and a comment.

11. The non-transitory computer readable storage medium of claim 8, wherein the received feedback includes real-time data collected at the reader device, and the real-time data including information relating to at least one of a time and a location identified by a global positioning system (GPS) at the reader device.

12. The non-transitory computer readable storage medium of claim 8, wherein the program comprises instructions further executable to transmit an indication that the portion of the electronic document includes confidential information to the reader device, wherein the indication is displayed when the portion is displayed on a display at the reader device.

13. The non-transitory computer readable storage medium of claim 8, wherein the program further comprises instructions executable to:
receive modifications to the portion of the electronic book over the user interface at the computing device; and
transmit at least the received modifications to the portion of the electronic book over the network interface at the computing device.

14. The non-transitory computer readable storage medium of claim 8, wherein the program further comprises instructions executable to transmit an advertisement for display on the display at the reader device, the advertisement associated with the electronic book, wherein the received eye tracking data is analyzed to identify whether and how long the reader focused on the advertisement.

15. An apparatus for a providing a document electronically to one or more readers for review, the apparatus comprising:
a display screen that displays a user interface that receives one or more reader feedback settings set by an author, wherein at least one of the reader settings specifies that at least a portion of an uploaded electronic book is to be encrypted;
a processor that executes instructions stored in memory, wherein execution of the instructions by the processor encrypts the specified portion of the uploaded electronic book in accordance with an encryption key; and
a network interface that:
transmits the encrypted portion of the electronic book to at least one reader device, wherein decryption of the encrypted portion by the reader device requires a decryption key corresponding to the encryption key,
receives eye tracking data collected by at least one sensor at the reader device after the decrypted portion is displayed at the reader device, and
receives feedback data from the reader device in association with a subset of content within the display at the reader device;
wherein the processor executes further instructions to identify that the received eye tracking data indicates a plurality of focal points directed at the subset of content; and
wherein the display screen generates a display of the electronic book, wherein the display screen further displays the received feedback data and indicates the focal points in association with the subset of content.

16. The apparatus of claim 15, wherein the reader settings further require biometric authentication at the reader device before the transmitted portion is displayed.

17. The apparatus of claim 15, wherein the received feedback includes at least one of a content rating, a grammar rating, a question, and a comment.

18. The apparatus of claim 15, wherein the received feedback includes real-time data collected at the reader device, and the real-time data including information relating to at least one of a time and a location identified by a global positioning system (GPS) at the reader computing device.

19. The apparatus of claim 15, wherein an indication that the portion of the electronic document includes confidential information is transmitted to the reader device, wherein the indication is displayed when the portion is displayed on the display at the reader device.

20. The apparatus of claim 15, wherein the communication interface further transmits an advertisement for display on the display at the reader device, the advertisement associated with the e-book, wherein the received eye tracking data is analyzed to identify whether and how long the reader focused on the advertisement.

* * * * *